United States Patent
Kanazawa et al.

Patent Number: 5,153,851
Date of Patent: Oct. 6, 1992

[54] METHOD AND ARRANGEMENT OF DETERMINING APPROXIMATED RECIPROCAL OF BINARY NORMALIZED FRACTION OF DIVISOR

[75] Inventors: Takashi Kanazawa, Tokyo; Masayuki Kimura, Yamanashi, both of Japan

[73] Assignee: NEC Corporation, Tokyo, Japan

[21] Appl. No.: 551,094

[22] Filed: Jul. 11, 1990

[30] Foreign Application Priority Data

Jul. 11, 1989 [JP] Japan ................................. 1-177029

[51] Int. Cl.$^5$ ................................................ G06F 7/52
[52] U.S. Cl. ................................... 364/765; 364/715.04
[58] Field of Search .................... 364/765, 715.04, 748

[56] References Cited

U.S. PATENT DOCUMENTS

| | | | |
|---|---|---|---|
| 3,633,018 | 1/1972 | Ling | 364/765 |
| 4,586,154 | 4/1986 | Berry | 364/715.04 |
| 4,707,798 | 11/1987 | Nakano | 364/765 |
| 4,789,956 | 12/1988 | Hildebrandt | 364/715.04 |
| 4,823,301 | 4/1989 | Knierim | 364/765 |
| 4,905,178 | 2/1990 | Mor | 364/715.04 |

*Primary Examiner*—David H. Malzahn
*Attorney, Agent, or Firm*—Sughrue, Mion, Zinn, Macpeak & Seas

[57] ABSTRACT

A selector is arranged to choose one of first and second incoming data. The first data is a fraction of a divisor applied from external circuitry, while the second data is a binary normalized first data in the event that the first data is not normalized in terms of a radix of the first data. The data chosen by the selector is stored in a register. A first predetermined number of upper bits (5 bits for example) of a fraction held in the register is checked to see if the fraction is normalized in terms of a radix of the first data. In the event that the fraction of a divisor stored in the register is found to be normalized in terms of a radix of the first data, the amount of shifting necessary to binary normalize the first predetermined number of upper bits of a fraction is determined. The amount of shifting thus detected is used to shift or binary normalize a second predetermined number of upper bits of a fraction stored in the register. The second predetermined number of upper bits thus binary normalized is used to generate an approximated reciprocal of a divisor. On the other hand, in the event that a fraction stored in the register is found to be unnormalized in terms of a radix of the first data, the selector chooses the second data.

9 Claims, 5 Drawing Sheets

FIG.2

| A | B | C | D | E |
|---|---|---|---|---|
| DATA NO. | CONTENT OF REGISTER 16 | UPPER 2 BITS OF REGISTER 16 | OUTPUT OF CHECKER 18 | AMOUNT OF SHIFTING AT SHIFTER 12 |
| 1 | 0 0000 X---X | 0 0 | 0 | MORE THAN 4 |
| 2 | 0 0001 X---X | 0 0 | 0 | 3 |
| 3 | 0 0010 X---X | 0 0 | 0 | 2 |
| 4 | 0 0011 X---X | 0 0 | 0 | 2 |
| 5 | 0 0100 X---X | 0 0 | 0 | 1 |
| 6 | 0 0101 X---X | 0 0 | 0 | 1 |
| 7 | 0 0110 X---X | 0 0 | 0 | 1 |
| 8 | 0 0111 X---X | 0 0 | 0 | 1 |
| 9 | 0 1000 X---X | 0 1 | 1 | 0 |
| 10 | 0 1001 X---X | 0 1 | 1 | 0 |
| 11 | 0 1010 X---X | 0 1 | 1 | 0 |
| 12 | 0 1011 X---X | 0 1 | 1 | 0 |
| 13 | 0 1100 X---X | 0 1 | 1 | 0 |
| 14 | 0 1101 X---X | 0 1 | 1 | 0 |
| 15 | 0 1110 X---X | 0 1 | 1 | 0 |
| 16 | 0 1111 X---X | 0 1 | 1 | 0 |
| 17 | 1 0000 X---X | 0 1 | 1 | 0 |
| 18 | 1 0001 X---X | 0 1 | 1 | 0 |
| 19 | 1 0010 X---X | 0 1 | 1 | 0 |
| 20 | 1 0011 X---X | 0 1 | 1 | 0 |
| 21 | 1 0100 X---X | 0 1 | 1 | 0 |
| 22 | 1 0101 X---X | 0 1 | 1 | 0 |
| 23 | 1 0110 X---X | 0 1 | 1 | 0 |
| 24 | 1 0111 X---X | 0 1 | 1 | 0 |
| 25 | 1 1000 X---X | 1 1 | 0 | 1 |
| 26 | 1 1001 X---X | 1 1 | 0 | 1 |
| 27 | 1 1010 X---X | 1 1 | 0 | 1 |
| 28 | 1 1011 X---X | 1 1 | 0 | 1 |
| 29 | 1 1100 X---X | 1 1 | 0 | 2 |
| 30 | 1 1101 X---X | 1 1 | 0 | 2 |
| 31 | 1 1110 X---X | 1 1 | 0 | 3 |
| 32 | 1 1111 X---X | 1 1 | 0 | MORE THAN 4 |

SIGN BIT (column B)     SIGN BIT (column C)

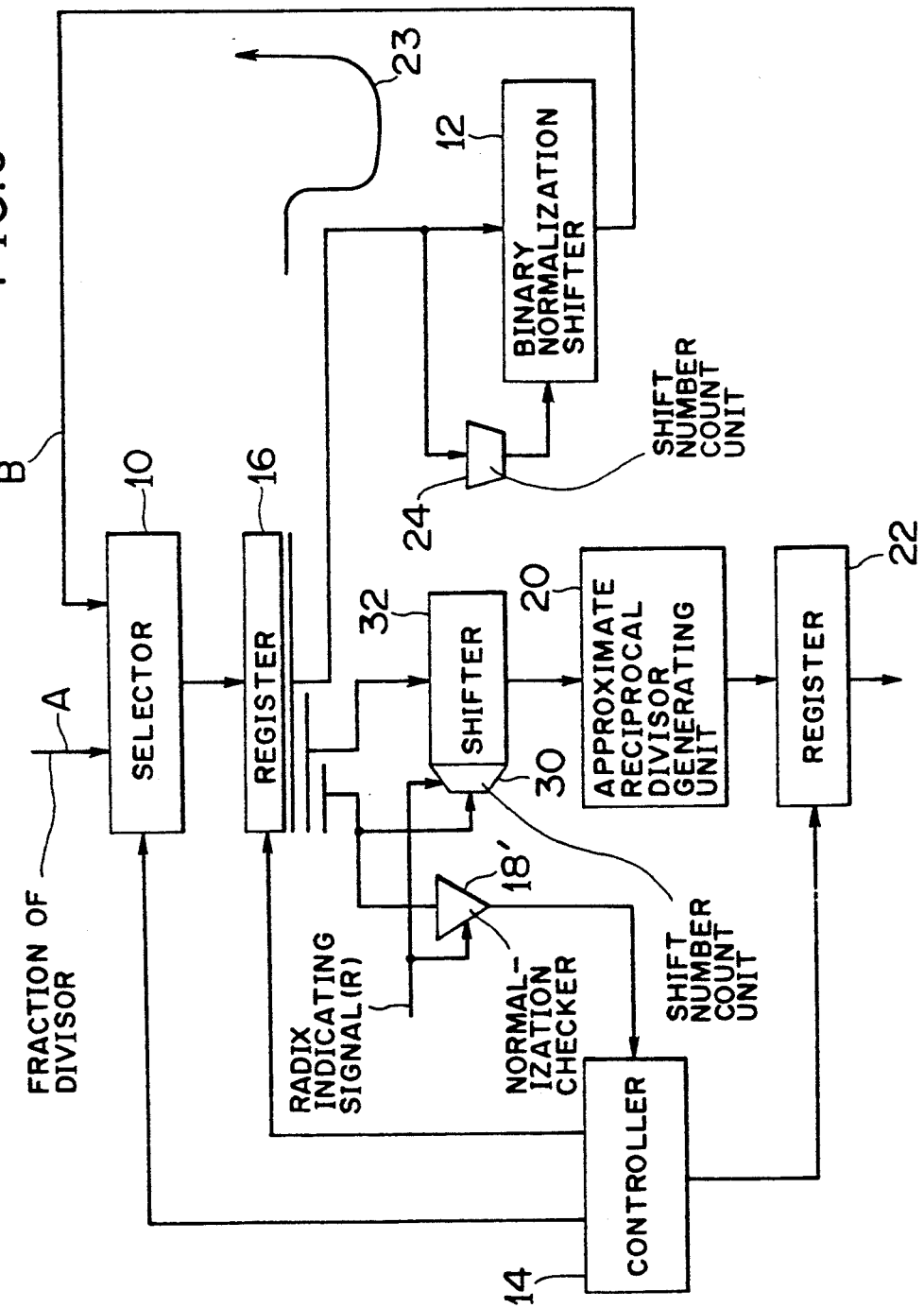

FIG.4

| A | B | C | D | E | F | G |
|---|---|---|---|---|---|---|
| DATA NO. | RADIX INDICATING SIGNAL (0: BINARY DATA 1: HEXADECIMAL DATA) | CONTENT OF REGISTER 16 | UPPER 5 BITS OF REGISTER 16 | OUTPUT OF CHECKER 18' | OUTPUT OF UNIT 30 | OUTPUT OF SHIFTER 32 |
| 1 | 0 | 0 0XXX X---X | 0 0XXX | 0 | 0 | 0 0XXX X---X |
| 2 | | 0 1XXX X---X | 0 1XXX | 1 | 0 | 0 1XXX X---X |
| 3 | | 1 0XXX X---X | 1 0XXX | 1 | 0 | 1 0XXX X---X |
| 4 | | 1 1XXX X---X | 1 1XXX | 0 | 0 | 1 1XXX X---X |
| 5 | | 0 0000 X---X | 0 0000 | 0 | 0 | 0 0000 X---X |
| 6 | | 0 0001 X---X | 0 0001 | 1 | 3 | 0 1XXX X---X |
| 7 | | 0 0010 X---X | 0 0010 | 1 | 2 | 0 10XX X---X |
| 8 | | 0 0011 X---X | 0 0011 | 1 | 2 | 0 11XX X---X |
| 9 | | 0 0100 X---X | 0 0100 | 1 | 1 | 0 100X X---X |
| 10 | | 0 0101 X---X | 0 0101 | 1 | 1 | 0 101X X---X |
| 11 | | 0 0110 X---X | 0 0110 | 1 | 1 | 0 1010 X---X |
| 12 | | 0 0111 X---X | 0 0111 | 1 | 1 | 0 1111 X---X |
| 13 | 1 | 0 1000 X---X | 0 1000 | 1 | 0 | 0 1000 X---X |
| 14 | | 0 1001 X---X | 0 1001 | 1 | 0 | 0 1001 X---X |
| 15 | | 0 1010 X---X | 0 1010 | 1 | 0 | 0 1010 X---X |
| 16 | | 0 1011 X---X | 0 1011 | 1 | 0 | 0 1011 X---X |
| 17 | | 0 1100 X---X | 0 1100 | 1 | 0 | 0 1100 X---X |
| 18 | | 0 1101 X---X | 0 1101 | 1 | 0 | 0 1101 X---X |
| 19 | | 0 1110 X---X | 0 1110 | 1 | 0 | 0 1110 X---X |
| 20 | | 0 1111 X---X | 0 1111 | 1 | 0 | 0 1111 X---X |
| 21 | | 1 0000 X---X | 1 0000 | 1 | 0 | 1 0000 X---X |
| 22 | | 1 0001 X---X | 1 0001 | 1 | 0 | 1 0001 X---X |
| 23 | | 1 0010 X---X | 1 0010 | 1 | 0 | 1 0010 X---X |
| 24 | | 1 0011 X---X | 1 0011 | 1 | 0 | 1 0011 X---X |
| 25 | | 1 0100 X---X | 1 0100 | 1 | 0 | 1 0100 X---X |
| 26 | | 1 0101 X---X | 1 0101 | 1 | 0 | 1 0101 X---X |
| 27 | | 1 0110 X---X | 1 0110 | 1 | 0 | 1 0110 X---X |
| 28 | | 1 0111 X---X | 1 0111 | 1 | 0 | 1 0111 X---X |
| 29 | | 1 1000 X---X | 1 1000 | 1 | 1 | 1 000X X---X |
| 30 | | 1 1001 X---X | 1 1001 | 1 | 1 | 1 001X X---X |
| 31 | | 1 1010 X---X | 1 1010 | 1 | 1 | 1 010X X---X |
| 32 | | 1 1011 X---X | 1 1011 | 1 | 1 | 1 011X X---X |
| 33 | | 1 1100 X---X | 1 1001 | 1 | 2 | 1 00XX X---X |
| 34 | | 1 1101 X---X | 1 1101 | 1 | 2 | 1 01XX X---X |
| 35 | | 1 1110 X---X | 1 1110 | 1 | 3 | 1 0XXX X---X |
| 36 | | 1 1111 X---X | 1 1111 | 0 | 0 | 1 1111 X---X |

SIGN BIT (columns C, D, G)

METHOD AND ARRANGEMENT OF DETERMINING APPROXIMATED RECIPROCAL OF BINARY NORMALIZED FRACTION OF DIVISOR

BACKGROUND OF THE INVENTION

1. Field of the Invention

The present invention relates generally to a method and arrangement of determining an approximated reciprocal of a divisor, and more specifically to such a method and arrangement wherein a fraction of a divisor is binary normalized and then applied to circuitry for generating an approximated reciprocal of a divisor. The approximated reciprocal thus generated is utilized to obtain a quotient by multiplying it by a dividend. The present invention features an effective reduction of operation time for obtaining binary normalized data.

2. Description of the Prior Art

It is known in the art to obtain a quotient of two binary numbers by determining an approximate reciprocal divisor and multiplying it by a dividend. Such arithmetic algorithms for obtaining a quotient by way of multiplication, has been disclosed in Japanese Laid-Open Patent Specification No. 57-41737 and U.S. Pat. No. 4,047,011, merely by way of example.

Before describing the present invention, a known technique for determining an approximated reciprocal of a divisor will be discussed with reference to FIGS. 1 and 2.

FIG. 1 shows in block diagram form, a known arrangement for determining an approximated reciprocal of a divisor, and FIG. 2 is a table showing part of a fraction of a divisor and outputs of blocks of the FIG. 1 arrangement for describing the FIG. 1 arrangement. In FIG. 2, "X" denotes bits which are not concerned with the operation of the FIG. 1 arrangement.

In FIG. 1, a selector 10 is arranged to receive two kinds of data A and B. The data A is a fraction of a divisor to be applied from external circuitry, while the data B is the output of a shifter 12. The shifter 12 is arranged to binary normalize a fraction of a divisor by left shifting thereof. The selector 10 chooses one of the data A and B in response to a control signal applied from a controller 14. The operations of the controller 14 and the shifter 12 will be described in more detail later.

A register 16 stores one of the data A and B from the selector 10. It should be noted that a fraction of a divisor stored within the register 16 takes a form which starts with a sign bit denoting fraction, "0" being positive and "1" being negative. The subsequent bit positions are occupied by fraction digits (see column B of FIG. 2).

The upper 2 bits of the content of the register 16 are applied to a binary normalization checker 18 which determines whether or not the fraction within the register 16 is binary normalized. The output of the checker 18 is applied to the controller 14.

On the other hand, a predetermined number of upper bits of the fraction stored within the register 16 is applied to a unit 20, which generates an approximated reciprocal of a divisor. However, whether or not a register 22 receives the result obtained by the unit 20 is determined by the controller 14.

Further, the whole fraction within the register 16 is applied to a shift number count unit 24 and also to the binary normalization shifter 12. The unit 24 determines the amount of shifting the fraction to left necessary for binary normalization. Following this, a shifter 12 binary normalizes the fraction applied from the register 16 using the output of the unit 24, and then applies the binary normalized number to the selector 10. It goes without saying that if the fraction within the register 16 is already binary normalized, the unit 24 determines the amount of shifting to be zero. Accordingly, in this instance the shifter 12 is not required to shift the fraction received from the register 16.

It should be noted that the blocks 12, 18, 20 and 24 are always supplied with the corresponding data from the register 16. The controller 14, in response to the output of the binary normalization checker 18, controls the selector 10 and the registers 16, 22. More specifically, in the event that the checker 18 detects that the fraction within the register 16 is not binary normalized, the controller 14 controls the selector 10 to choose the data B and allows the register 16 to receive the output of the selector 10. Further, the controller 14 inhibits the register 22 to receive the output of the unit 20.

It is vital in the FIG. 1 arrangement that data applied to the unit 20 should be binary normalized. This is because, if the unit 20 is not supplied with a binary normalized data, the hardware arrangement of the unit 20 becomes extremely bulky. More specifically, it is assumed that a radix point of a fraction is between the most significant bit (MSB) (namely a sign bit) and the second MSB. Thus, a divisor Y (in 2's compliment) which is binary normalized can be represented as follows:

$$1.0000\ldots 0_{(2)} \leq Y < 1.0111\ldots 1_{(2)}$$
$$(-1_{(10)} \leq Y < -0.5_{(10)})$$
$$0.1000\ldots 0_{(2)} \leq Y < 0.1111\ldots 1_{(2)}$$
$$(0.5_{(10)} \leq Y < 1.0_{(10)})$$

wherein each parenthesized number denotes a radix. An approximated reciprocal of the binary normalized divisor $R (=1/Y)$ falls within the following ranges:

$-2_{(10)} < R \leq -1_{(10)}$ $1_{(10)} < R \leq 2_{(10)}$

Meanwhile, in the event that a divisor Y is not binary normalized, the integer part of $R=1/Y$ increases infinitely. On the other hand, by way of example, a divisor is assumed to be a normalized hexadecimal data, then the integer part of $R=1/Y$ becomes a finite number. However, if the unit 20 is configured to generate an approximated reciprocal of a normalized hexadecimal, the hardware arrangement of unit 20 becomes very large as compared with the case wherein the unit 20 deals with binary normalized data. This is the reason why the unit 20 should be supplied with binary normalized numbers.

The operation of the FIG. 1 arrangement will be further described with reference to FIG. 2. It is assumed that data to be treated by the FIG. 1 arrangement is binary or hexadecimal floating point data. Whether the data is binary or hexadecimal depends on the program being executed. Consequently, the data stored in the register 16 exhibits 32 variations in the event that the upper 5 bits thereof are considered (see columns A and B of FIG. 2). It should be noted that each of the data shown in FIG. 2 is represented in 2's compliment.

The selector 10 is first supplied, from external circuitry, with a fraction of a divisor. In this instance, the register 16 stores the externally applied fraction of a divisor through the selector 10. Following this, the binary normalization checker 18 receives the upper 2 bits of the content of the register 16, and the unit 20 receives a predetermined number of upper bits of the register 16. Further, both of the shift number count unit 24 and the shifter 12 receive the whole fraction of the register 16. The checker 18 checks to see if the fraction stored in the register 16 is binary normalized or not. It should be noted that the MSB is a sign bit for fraction. The binary normalization check result is applied from the checker 18 to the controller 14 whose output is coupled to the selector 10, the registers 16 and 22. It is assumed for the sake of explanation that the check result assumes a logic 0 in the event the fraction within the register 16 is binary unnormalized, and assumes a logic 1 when the fraction within the register 16 is binary normalized (see column D of FIG. 2).

As shown in column D of FIG. 2, the data No. 1 to 8 and 25 to 32 are not binary normalized, while the data No. 9 to 24 are binary normalized. As is known, determining whether the data is binary normalized or not, is performed by checking to see if the upper 2 bits exhibit the same logic values or not.

In the event the checker 18 determines that the fraction of a divisor within the register 16 is binary normalized, the checker 18 applies a logic 1 to the controller 14. Since the approximate reciprocal divisor generating unit 20 receives a normalized binary data in this case, the controller 14 allows the register 22 to store the approximated reciprocal of a divisor outputted from the unit 20.

On the contrary, if the checker 18 determines that the fraction of a divisor within the register 16 is not binary normalized, the checker 18 applies a logic 0 to the controller 14. In response to the logic 0 applied, the controller 14 controls the selector 10 to choose the data B (viz., the output of the shifter 12). In this instance, the controller 14 inhibits the register 22 to acquire the calculation result fed from the unit 20 as the unit 20 calculates an approximated reciprocal of an unnormalized divisor.

As mentioned previously, the unit 24 receives the whole fraction within the register 16 and determines the amount of left shifting necessary for binary normalization thereof. The operation of the unit 24 is independent of those of the blocks 18 and 20. The unit 24 applies the output thereof to the shifter 12. The shifter 12 binary normalizes (if necessary) a fraction of a divisor in response to the output of the unit 24 (see column E of FIG. 2). The shifter 12 applies the binary normalized data to the selector 10. In the event that the checker 18 detects the fraction stored within the register 16 is not binary normalized, the controller 14 steers the selector 10 to apply the output of the shifter 12 to the register 16 and allows the register 16 to acquire the output of the selector 10. Thereafter, the register 16 again applies the upper 2 bits of the content thereof to the checker 18 and simultaneously applies a predetermined number of upper bits of the content thereof to the unit 20. In this instance, the fraction of a divisor stored in the register 16 is now binary normalized, the checker 18 outputs a logic 1 and the controller 14 allows the output of the unit 20 to be applied to the register 22. In the above description, should the fraction of a divisor be binary normalized, the exponent should be shifted to the left to meet the shifting of the fraction.

It should be noted that even if the fraction of a divisor applied from external circuitry to the selector 10 is a normalized hexadecimal, the possibility that the normalized hexadecimal is also binary normalized is very low. As shown in FIG. 2, the binary unnormalized data comprise about one-half of the thirty two data. In practice, however, this ratio will vary with the data applied to the FIG. 1 arrangement. As will be appreciated, the relatively large amount of binary unnormalized data must be subject to binary normalization using the circuits 24 and 12.

However, the binary normalization using loop 23 requires the normalization of an entire fraction within the register 16 and hence wastes one or two clocks of operation time therefor. Consequently, the prior art techniques shown in FIG. 1 has encountered a problem that a long execution time is inevitably necessary for generating an approximated reciprocal of a divisor.

SUMMARY OF THE INVENTION

It is an object of the present invention to provide a method and arrangement of shortening the time required for generating an approximated reciprocal of a divisor.

Another object of the present invention is to provide a method and an arrangement of markedly shortening the time required for preparing binary normalized numbers to be applied to an approximate reciprocal divisor generating circuit.

In brief, the above objects are achieved by an arrangement wherein a selector is arranged to choose one one of first and second incoming data. The first data is a fraction of a divisor applied from external circuitry, while the second data is a binary normalized first data in the event that the first data is not normalized in terms of a radix of the first data. The data chosen by the selector is stored in a register. A first predetermined number of upper bits (5 bits for example) of a fraction held in the register is checked to see if the fraction is normalized in terms of a radix of the first data. In the event that the fraction of a divisor stored in the register is found to be normalized in terms of a radix of the first data, the amount of shifting necessary to binary normalize the first predetermined number of upper bits of a fraction is determined. The amount of shifting thus detected is used to shift or binary normalize a second predetermined number of upper bits of a fraction stored in the register. The second predetermined number of upper bits thus binary normalized is used to generate an approximated reciprocal of a divisor. On the other hand, in the event that a fraction stored in the register is found to be unnormalized in terms of a radix of the first data, the selector chooses the second data.

More specifically a first aspect of the present invention comes in an arrangement for generating an approximated reciprocal of a divisor, comprising: first means, the first means selecting and storing one of first and second data, the first data being a fraction of a divisor applied from external circuitry, and the second data being a binary normalized first data; second means, the second means coupled to the first means and receiving a first predetermined number of upper bits of a fraction of a divisor stored in the first means and receiving a signal indicative of a radix of the first data, the second means checking to see if a fraction of a divisor stored in the first means is normalized in terms of the radix of the first data, the second means determining and outputting, in the event that the second means detects that the fraction stored in the first means is normalized in terms of the radix of the first data, the amount of shifting necessary to binary normalize the first predetermined number of upper bits; third means, the third means coupled to the first and second means and receiving a second predetermined number of upper bits of a fraction, the third means implementing shifting of the second predetermined number of upper bits for binary normalization in accordance with the amount of shifting received from the second means; fourth means, the fourth means coupled to the first means, the fourth means receiving and binary normalizing a fraction stored in the first means, the fourth means applying a binary normalized fraction to the first means as the second data; fifth means, the fifth means coupled to the third means, the fifth means receiving data from the third means and generating an approximated reciprocal of a divisor; and seventh means, the seventh means coupled to the first and second means, the seventh means controlling the first means to select the second data in the event that the second means detects that the fraction stored in the first means is unnormalized in terms of the radix of the first data.

A second aspect of the present invention comes in the form of a method of generating an approximated reciprocal of a divisor, comprising the steps of: (a) selecting and storing one of first and second data, the first data being a fraction of a divisor applied from external circuitry, and the second data being a binary normalized first data; (b) receiving a first predetermined number of upper bits of a fraction of a divisor stored in step (a) and receiving a signal indicative of a radix of the first data, checking to see if a fraction of a divisor stored in step (a) is normalized in terms of the radix of the first data, and determining and outputting the amount of shifting necessary to binary normalize the first predetermined number of upper bits in the event that a fraction stored in step (a) is normalized in terms of a radix of the first data; (c) receiving a second predetermined number of upper bits of a fraction, implementing shifting of the second predetermined number of upper bits for binary normalization in accordance with the amount of shifting obtained in step (b); and (d) receiving and binary normalizing a fraction of a divisor stored in step (a), and outputting a binary normalized fraction as the second data; (e) receiving a result outputted in step (c) and outputting an approximated reciprocal of a divisor.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 2 is a table showing part of a fraction of a divisor and outputs of blocks of the FIG. 1 arrangement, FIG. 2 having been referred to in the opening paragraphs of the instant specification;

FIG. 3 is a block diagram showing an arrangement for generating an approximated reciprocal of a divisor according to first embodiment of the present invention;

FIG. 4 is a table showing part of a fraction of a divisor and outputs of blocks of the FIG. 3 arrangement.

DETAILED DESCRIPTION OF THE PREFERRED EMBODIMENTS

A first preferred embodiment of this invention will be described with reference to FIGS. 3 and 4.

Figure 1:
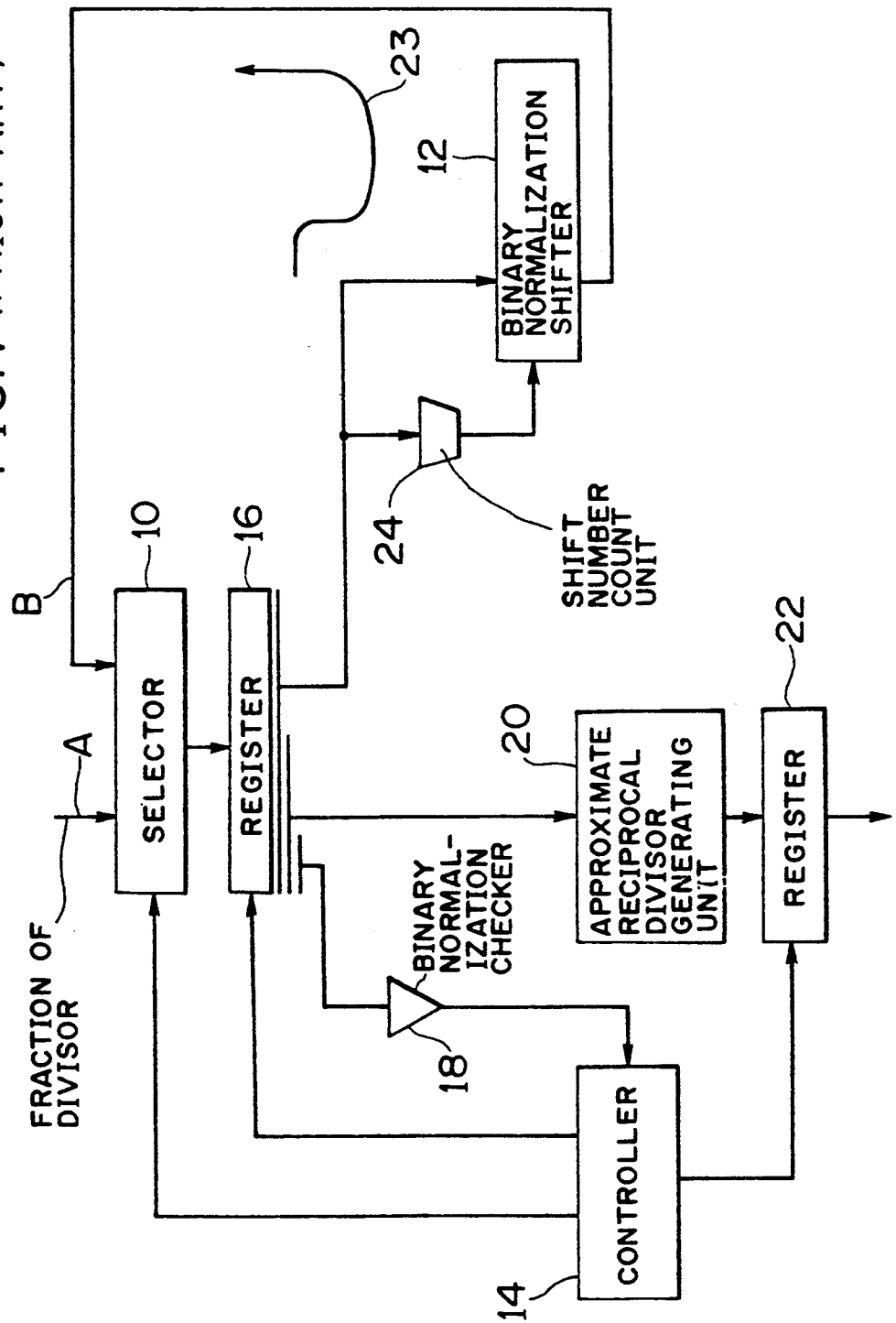
FIG. 1 is a block diagram showing a known arrangement for generating an approximated reciprocal of a divisor, FIG. 1 having been referred to in the opening paragraphs of the instant specification.

The arrangement of FIG. 3 differs from that of FIG. 1 in that: (a) the former arrangement is further provided with a shift number count unit 30 and a binary normalization shifter 32; (b) a normalization checker 18' is configured to receive the upper 5 bits of a content of the register 16; and (c) a signal indicative of a radix of the first data A is fed to the blocks 18' and 30.

The FIG. 3 arrangement will be discussed with reference to FIG. 4. It is assumed that data to be treated by the FIG. 3 arrangement is binary or hexadecimal floating point data. Whether the data is binary or hexadecimal depends on the program being executed. Since this invention utilizes the radix indicating signal R indicating that a fraction of a divisor is binary or hexadecimal data, the data stored in the register 16 are grouped into 4 kinds of binary data and 32 kinds of hexadecimal data in the event that the upper 2 and 5 bits thereof are respectively considered (column C of FIG. 4). Each of the data shown in FIG. 4 is represented in 2's compliment. In FIG. 4, "X" denotes bits which are not concerned with the operation of the FIG. 3 arrangement.

The selector 10 is first supplied, from external circuitry, with a fraction of a divisor. In this instance, the register 16 stores the externally applied fraction of a divisor through the selector 10. Upper 5 bits of the content of the register 16 (column D of FIG. 4) is applied to the normalization checker 18' and also to the shift number count unit 30. Further, a predetermined number of upper bits of the fraction within the register 16 is applied to the binary normalization unit 32. Still further, the whole fraction stored within the register 16 is fed to the shift number count unit 24 as well as the shifter 12.

The predetermined number of upper bits, applied to the unit 32, have previously been ascertained on a case by case basis. By way of example, the radix indicating signal R assumes a logic 0 in the case where the data applied from external circuitry to the selector 10 are binary, while the signal R assumes a logic 1 in the case where hexadecimal data are applied to the selector 10 (column B of FIG. 4). The checker 18' checks to see if the fraction stored in the register 16 is normalized in terms of a radix indicated by the signal R. More specifically, if the radix indicating signal R assumes a logic 0, the checker 18' checks to see if the content of the register 16 is binary normalized. On the other hand, if the signal R assumes a logic 1 then the checker 18' checks to see if the content of the register 16 is hexadecimally normalized. The check result from the checker 18' is applied to the controller 14. The output of the controller 14 is coupled to the selector 10 and the registers 16, 22 as in the FIG. 1 arrangement. It is assumed in the instant specification that the check result outputted from the checker 18' assumes a logic 0 in the event that the fraction within the register 16 is not binary or hexadecimally normalized, and assumes a logic 1 if the fraction within the register 16 is binary or hexadecimally normalized (see column E of FIG. 4).

The shift number count unit 30 checks to see if the fraction stored in the register 16 is normalized in terms of the radix indicated by the signal R just as the checker 18'. If the fraction is found to be normalized in terms of the radix, the unit 30 determines the amount of left shifting for binary normalization. The output of the unit 30 is applied to the shifter 32. Contrarily, if the unit 30 detects that the fraction is not normalized in terms of a radix indicated by the signal R, the unit 30 applies zero shifting information to the shifter 32. As shown in column E of FIG. 4, the data Nos. 1 and 4 are not binary normalized, while the data Nos. 5 to 36 are not hexadecimally normalized.

In the event that the checker 18' determines the fraction of a divisor within the register 16 is binary normalized (in the case of Data Nos. 2 and 3), the checker 18' applies a logic 1 to the controller 14. In this instance, there is no need for the shifter 32 implement any shifting. Since the approximate reciprocal divisor generating unit 20 receives a normalized binary data through the shifter 32, the controller 14 allows the register 22 to acquire the output of the unit 20.

On the other hand, in the event the checker 18' determines that the fraction of a divisor within the register 16 is hexadecimally normalized (in the case of the data Nos. 6 through 35), it applies a logic 1 to the controller 14. The shift number counting unit 30 determines the amount of left shifting for binary normalization of the hexadecimal number, the amount of which is shown in column F of FIG. 4. It should be noted that: (a) the data Nos. 13 through 28 requires no shifting for binary normalization; and (b) the data Nos. 6–12 and 29–35 requires left shifting for binary normalization by an amount which varies from 1 to 3 bits. Since the approximate reciprocal divisor generating unit 20 receives a normalized binary data through the shifter 32, the controller 14 allows the register 22 to acquire the output of the unit 20.

On the contrary, in the event that the checker 18' decides the fraction of a divisor within the register 16 is not binary normalized (in the case of the data Nos. 1 and 4), it applies a logic 0 to the controller 14. In this instance, the controller 14 dose not allow the register 22 to receive the output of the unit 20. The reason for this is that the unit 20 has calculated an approximate reciprocal of an unnormalized binary fraction divisor (see column G of FIG. 4). The shift number count unit 24 determines the amount of left shifting necessary for binary normalization of the data inputted thereto and applies the output thereof to the shifter 12. The shifter 12 implements binary normalization on the fraction of a divisor in response to the output of the unit 24. It should be noted that the operations of the blocks 24 and 12 are independent of those of the blocks 18' and 30 and 32. The shifter 12 applies the binary normalized data to the selector 10. In this particular instance, the controller 14 induces the selector 10 to apply the output of the shifter 12 to the register 16. Further, the controller 14 allows the register 16 to acquire the output of the selector 10. Thereafter, the blocks 18' and 30 are supplied with the upper 5 bits of the content of the register 16. Further, the shifter 32 receives the predetermined upper bits of the content of the register 16. Since the fraction of a divisor stored in the register 16 is now binary normalized, the checker 18' outputs a logic 1. The controller 14 accordingly allows the register 22 to receive the output of the unit 20.

Further, in the event the checker 18' decides that the fraction of a divisor within the register 16 is not hexadecimally normalized (in the case of the data Nos. 5 and 36), it applies a logic 0 to the controller 14. The subsequent operations of this case are identical to the case where the checker 18' determines that the content within the register 12 is not binary normalized as previously mentioned.

Figure 5:
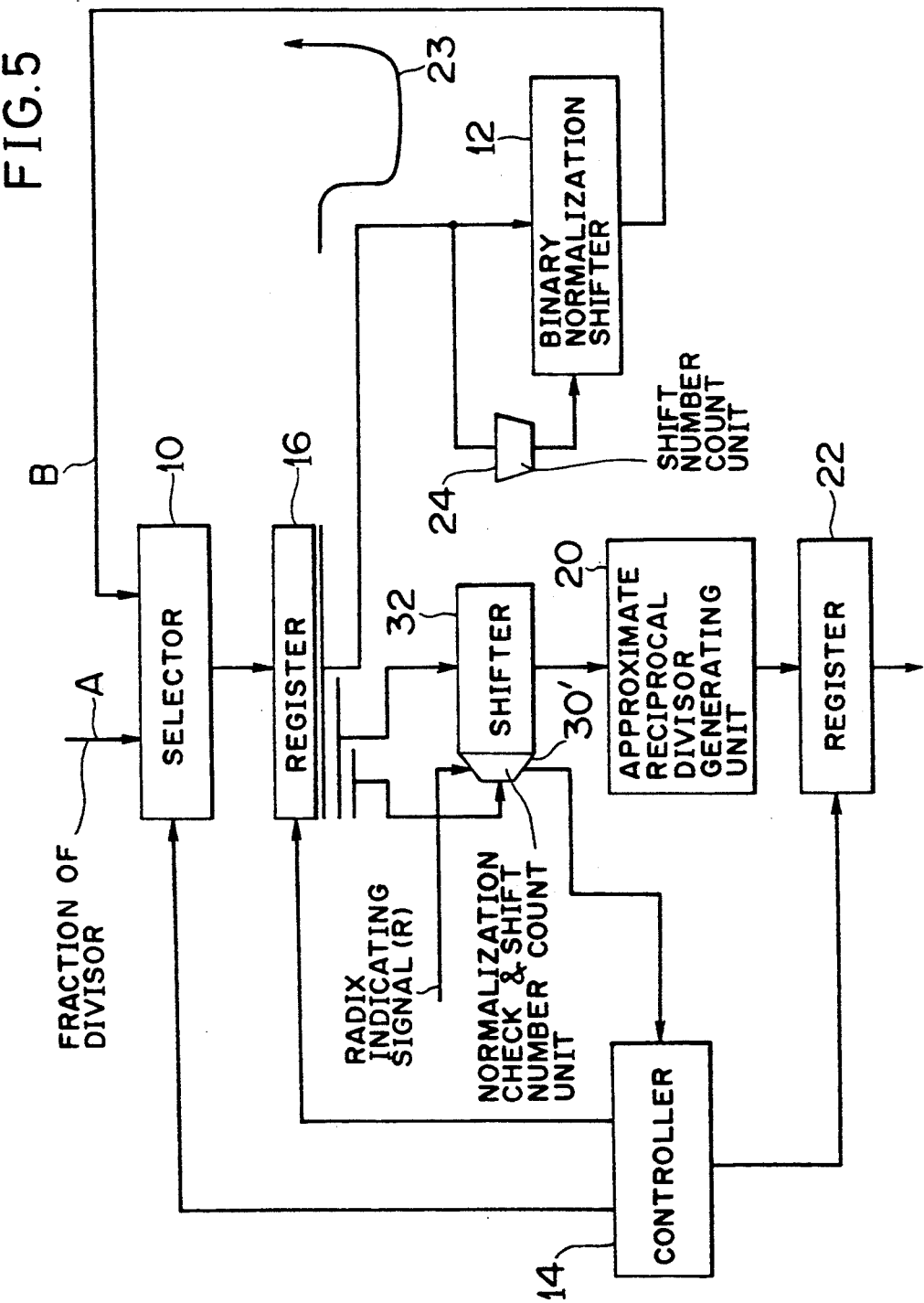
FIG. 5 is a block diagram showning an arrangement for generating an approximated reciprocal of a divisor according to second embodiment of the present invention.

FIG. 5 illustrates in block diagram form a second preferred embodiment of this invention. As described previously, the shift number count unit 30 (FIG. 3) is arranged to initially check to see if the fraction within the register 16 is normalized in terms of a radix of the first data A, which operation is the same as the checker 18'. Accordingly, the checker 18' can be omitted for simplifying the arrangement. In order to meet this modification, a unit 30' (corresponding to the unit 30) is configured to apply a signal to the controller 14. The signal is exactly the same as the output of the checker 18' of the first embodiment. The remaining portions of FIG. 5 are identical to those of FIG. 3 and hence further descriptions thereof will be omitted for simplicity.

It is understood from the above descriptions of this invention that: (a) most of the incoming data can be binary normalized using the shifter 32; and (b) the number of operations that the controller 14 selects the output of the shifter 12, can be remarkably reduced as compared with the known technique. Since the shifter 32 is adequate for shifting the predetermined number of upper bits of the fraction of a divisor, operation time for binary normalizing the predetermined number of upper bits is markedly reduced as compared with the aforesaid conventional technique.

In the above descriptions, it is assumed that binary and hexadecimal data are applied from external circuitry, however, the present invention is in no way limited thereto.

While the foregoing description describes two embodiments of the present invention, tho various alternatives and modifications possible without departing from the scope of the present invention, which is limited only by the appended claims, will be apparent to those skilled in the art.

What is claimed is:

1. A hardware arrangement for generating an approximated reciprocal of a divisor, comprising:

first means, said first means selecting and storing one of first and second data, said first data being a fraction of a divisor applied from external circuitry, and said second data being a binary normalized first data;

second means, said second means coupled to said first means and receiving a first predetermined number of upper bits of a fraction of a divisor stored in said first means and receiving a signal indicative of a radix of said first data, said second means checking to see if a fraction of a divisor stored in said first means is normalized in terms of the radix of said first data, said second means determining and outputting, in the event that said second means detects that the fraction stored in said first means is normalized in terms of the radix of said first data, the amount of shifting necessary to binary normalize said first predetermined number of upper bits;

third means, said third means coupled to said first and second means and receiving a second predetermined number of upper bits of a fraction, said third means implementing shifting of said second predetermined number of upper bits for binary normalization in accordance with the amount of shifting received from said second means;

fourth means, said fourth means coupled to said first means, said fourth means receiving and binary normalizing a fraction stored in said first means, said fourth means applying a binary normalized fraction to said first means as said second data;

fifth means, said fifth means coupled to said third means, said fifth means receiving data from said third means and generating an approximated reciprocal of a divisor; and sixth means, said sixth means coupled to said first and second means, said sixth means controlling said first means to select said second data in the event that said second means detects that the fraction stored in said first means is unnormalized in terms of the radix of said first data.

2. A hardware arrangement as claimed in claim 1, further comprising:

eighth means, said eighth means coupled to said fifth means, said seventh means inhibiting said eighth means to acquire an output of said fifth means in the event that said second means detects that the fraction stored in said first means is unnormalized in terms of the radix of said first data.

3. A hardware arrangement as claimed in claim 2, wherein said first means includes:

a selector for selecting said second data under the control of said seventh means in the event that said second means detects that a fraction stored in said first means is not normalized; and a register, coupled to said selector, being controlled by said seventh means to acquire said second data in the event that said second means detects that said first data is not normalized in terms of a radix of said first data.

4. A hardware arrangement as claimed in claim 1 or 2, wherein said second means includes:

first circuitry coupled to said first means, said first circuitry receiving said first predetermined number of upper bits of a fraction and receiving said signal indicative of a radix, said first circuitry checking to see if a fraction stored in said first means is normalized in terms of a radix of said first data; and second circuitry coupled to said first circuitry and said first means, said second circuitry determining and outputting the amount of shifting necessary to binary normalize said first predetermined number of upper bits of a fraction in the event that said first circuitry detects that a fraction stored in said first means is normalized in terms of a radix of said first data.

5. A hardware arrangement as claimed in claim 1 or 2, wherein said fourth means includes:

first circuitry coupled to receive said first and second data from said first means, said first circuitry being arranged to determine and output the amount of shifting necessary to binary normalize said first and second data; and second circuitry coupled to said first circuitry and said first means, said second circuitry being arranged to binary normalize said first and second data in accordance with the amount of shifting received from said first circuitry.

6. A hardware arrangement for generating an approximated reciprocal of a divisor, comprising:

first means, said first means selecting and storing one of first and second data, said first data being a fraction of a divisor applied from external circuitry, and said second data being a binary normalized first data;

second means, said second means coupled to said first means and receiving a first predetermined number of upper bits of a fraction of a divisor stored in said first means and receiving a signal indicative of a radix of said first data, said second means checking to see if a fraction of a divisor stored in said first means is normalized in terms of the radix of said first data, said second means determining and outputting, in the event that said second means detects that the fraction stored in said first means is normalized in terms of the radix of said first data, the amount of shifting necessary to binary normalize said first predetermined number of upper bits;

third means, said third means coupled to said first and second means and receiving a second predetermined number of upper bits of a fraction, said third means implementing shifting of said second predetermined number of upper bits for binary normalization in accordance with the amount of shifting received from said second means;

fourth means, said fourth means coupled to said first means, said fourth means receiving and binary normalizing a fraction stored in said first means, said fourth means applying a binary normalized fraction to said first means as said second data;

fifth means, said fifth means coupled to said third means, said fifth means receiving data from said third means and generating an approximated reciprocal of a divisor;

sixth means, said sixth means coupled to said first and second means, said sixth means controlling said first means to select said second data in the event that said second means detects that the fraction stored in said first means is unnormalized in terms of the radix of said first data; and seventh means, said seventh means coupled to said fifth means, said sixth means inhibiting said seventh means to acquire an output of said fifth means in the event that said second means detects that the fraction stored in said first means is unnormalized in terms of the radix of said first data.

7. A method of generating an approximated reciprocal of a divisor, comprising the steps of:

(a) selecting and storing first data, said first data being a fraction of a divisor applied from external circuitry;

(b) receiving a first predetermined number of upper bits of a fraction of a divisor stored in step (a) and receiving a signal indicative of a radix of said first data, checking to see if a fraction of a divisor stored in step (a) is normalized in terms of the radix of said first data, and determining and outputting the amount of shifting necessary to binary normalize said first predetermined number of upper bits in the event that a fraction stored in step (a) is normalized in terms of a radix of said first data;

(c) receiving a second predetermined number of upper bits of a fraction, implementing shifting of said second predetermined number of upper bits for binary normalization in accordance with the amount of shifting obtained in step (b); and (d) receiving a result outputted in step (c) and outputting an approximated reciprocal of a divisor.

8. A method as claimed in claim 7, further comprising the step of:

inhibiting an approximated reciprocal of a divisor obtained in step (d) to be applied to circuitry arranged to receive said approximated reciprocal of a divisor obtained in step (d) in the event that a fraction stored in step (a) is found to be unnormalized in terms of a radix of said first data.

9. A method of generating an approximated reciprocal of a divisor, comprising the steps of:
(a) selecting and storing first data, said first data being a fraction of a divisor applied from external circuitry;
(b) receiving a first predetermined number of upper bits of a fraction of a divisor stored in step (a) and receiving a signal indicative of a radix of said first data, checking to see if a fraction of a divisor stored in step (a) is normalized in terms of the radix of said first data, and determining and outputting the amount of shifting necessary to binary normalize said first predetermined number of upper bits in the event that a fraction stored in step (a) is normalized in terms of a radix of said first data;
(c) receiving a second predetermined number of upper bits of a fraction, implementing shifting of said second predetermined number of upper bits for binary normalization in accordance with the amount of shifting obtained in step (b);
(d) receiving a result outputted in step (c) and outputting an approximated reciprocal of a divisor; and
(e) inhibiting an approximated reciprocal of a divisor obtained in step (d) to be applied to circuitry arranged to receive said approximated reciprocal of a divisor obtained in step (d) in the event that a fraction stored in step (a) is found to be unnormalized in terms of a radix of said first data.

* * * * *